United States Patent [19]

Takahashi et al.

[11] 4,059,253

[45] Nov. 22, 1977

[54] APPARATUS FOR COOLING STEEL BLOOMS, SLABS, AND THE LIKE

[75] Inventors: Yutaka Takahashi; Toshiji Kobayashi, both of Kobe, Japan

[73] Assignee: Kawasaki Yukogyo Kabushiki Kaisha, Kobe, Japan

[21] Appl. No.: 687,604

[22] Filed: May 18, 1976

[30] Foreign Application Priority Data

May 22, 1975 Japan .................................. 50-61572

[51] Int. Cl.² ................................................ C21D 1/62
[52] U.S. Cl. ................................................ 266/259
[58] Field of Search .................. 72/201, 202; 266/259, 266/260; 165/47, 53, 169, 120; 432/83; 148/2

[56] References Cited

U.S. PATENT DOCUMENTS

| | | | |
|---|---|---|---|
| 1,825,380 | 9/1931 | Alinder et al. | 266/259 |
| 2,209,968 | 8/1940 | Gould et al. | 148/2 |
| 2,805,851 | 9/1957 | Becker et al. | 266/193 |
| 3,320,931 | 5/1967 | Durham | 266/155 |
| 3,895,498 | 7/1975 | Manthey et al. | 266/132 |

Primary Examiner—Gerald A. Dost

[57] ABSTRACT

Hot steel slabs are cooled in upright, edge-on state between respective pairs of adjacent cooling walls, each of which comprises a row of intercommunicating boiler tubes conducting cooling water and constituting one component of a circulatory heat recovery system. As the slabs cool, heat is transferred therefrom principally by radiation to the cooling walls, in which the cooling water is turned into a mixture of steam and hot water. A slab handling system comprising roller conveyers, slab uprighting and tilting devices, and a tong crane for picking up and lowering slabs is provided.

5 Claims, 2 Drawing Figures

APPARATUS FOR COOLING STEEL BLOOMS, SLABS, AND THE LIKE

BACKGROUND OF THE INVENTION

This invention relates generally to the production of steel blooms, slabs, castings, and the like (hereinafter referred to collectively as steel blocks) and more particularly to a steel block cooling apparatus for cooling to a specific temperature steel blocks at high temperature which have been formed by a blooming mill, a slabbing mill, or the like or by continuous casting and, at the same time, recovering the sensible heat of the high-temperature steel blocks in the form steam.

Steels produced in steel manufacturing plants have to be passed through several heating and cooling steps in their production processes. The methods of cooling in the cooling steps differ depending on the kind of steel material. For example, a steel block which has been heated and equalized in a soaking pit, even after being rolled in a slabbing mill and being cut by a shearing machine, is still at a temperature as high as approximately 1,000° C and is therefore sent to a cooling yard and cooled to a temperature below approximately 100° C before being subjected to subsequent processing.

The cooling procedures may be divided broadly into three kinds as general standards, namely, slow cooling in the case of alloy steels and high-carbon steels, air cooling in the case of medium-carbon steels, and water quenching in the case of low-carbon steels. Thus, the rate of cooling is varied for different kinds of steels.

This invention relates to a steel block cooling apparatus effective for cooling at rates corresponding principally to air cooling among the above mentioned three kinds of cooling.

The most common method at present of air cooling steel blocks at high temperature after a process such as slabbing is piling in a cooling yard. In the case of slabs, several slabs are ordinarily piled in order to utilize economically the air cooling yard space. However, this piling of several slabs causes a difference in the cooling rates of the upper and lower surfaces of each slab, and this difference gives rise to a corresponding strain and warping in each slab. While this warping is small in a steel slab of short length, the warping in a slab of long length is great and gives rise to problems in conveying of the slabs to the succeeding process steps and in these steps.

SUMMARY OF THE INVENTION

It is an object of this invention to provide a steel block cooling apparatus capable of cooling steel blocks efficiently and economically and, at the same time, recovering some of the heat released by the steel blocks during cooling.

Another object of the invention is to provide a steel block cooling apparatus adapted for cooling steel slabs in upright, edge-on state thereby to prevent warping of the steel slabs and thereby to achieve economy of space.

According to this invention, briefly summarized, there is provided a steel block cooling apparatus comprising: a cooling device comprising a base floor structure and vertical cooling walls disposed in mutually parallel and spaced-apart arrangement on the floor structure to form therebetween cooling positions for steel blocks at high temperature, each cooling wall being provided with means for passage of cooling water therethrough, steel blocks at high temperature to be cooled being placed on the floor structure in respective cooling positions between adjacent cooling walls and being cooled principally by radiation of heat, which is absorbed by the cooling walls.

The nature, utility, and further features of this invention will be more clearly apparent from the following detailed description with respect to a preferred embodiment of the invention when read in conjunction with the accompanying drawings, in which like parts are designated by like reference numerals.

DETAILED DESCRIPTION

Figure 1:
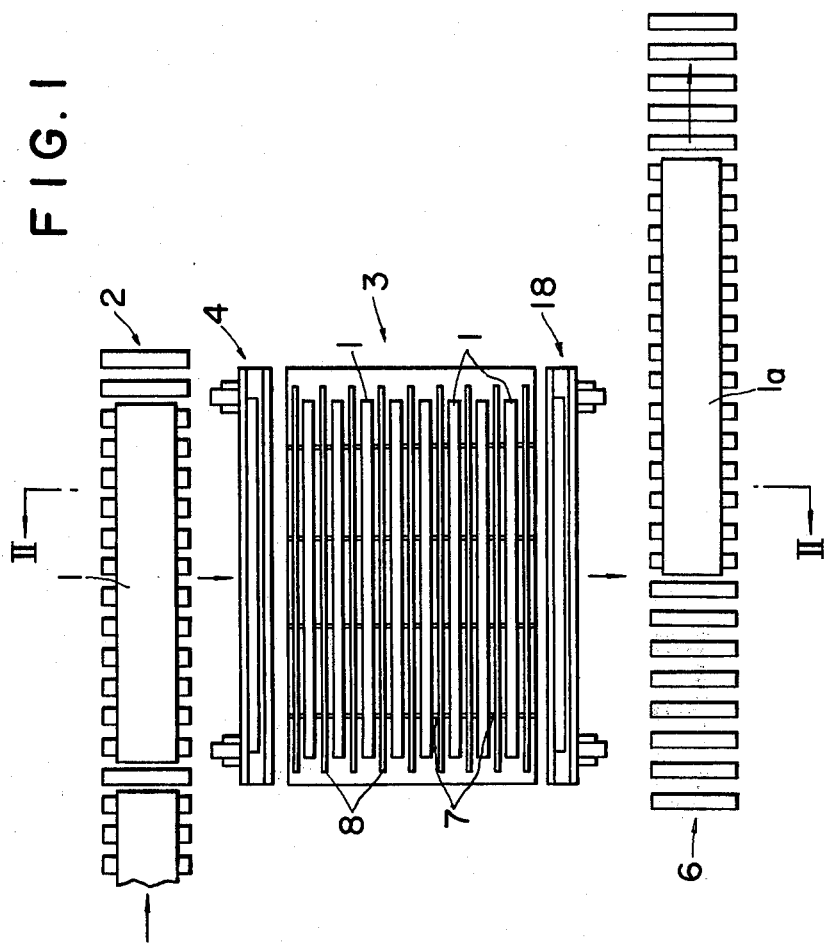
FIG. 1 is a diagrammatic plan view showing the general organization of one example of a steel block cooling apparatus according to this invention.
Figure 2:
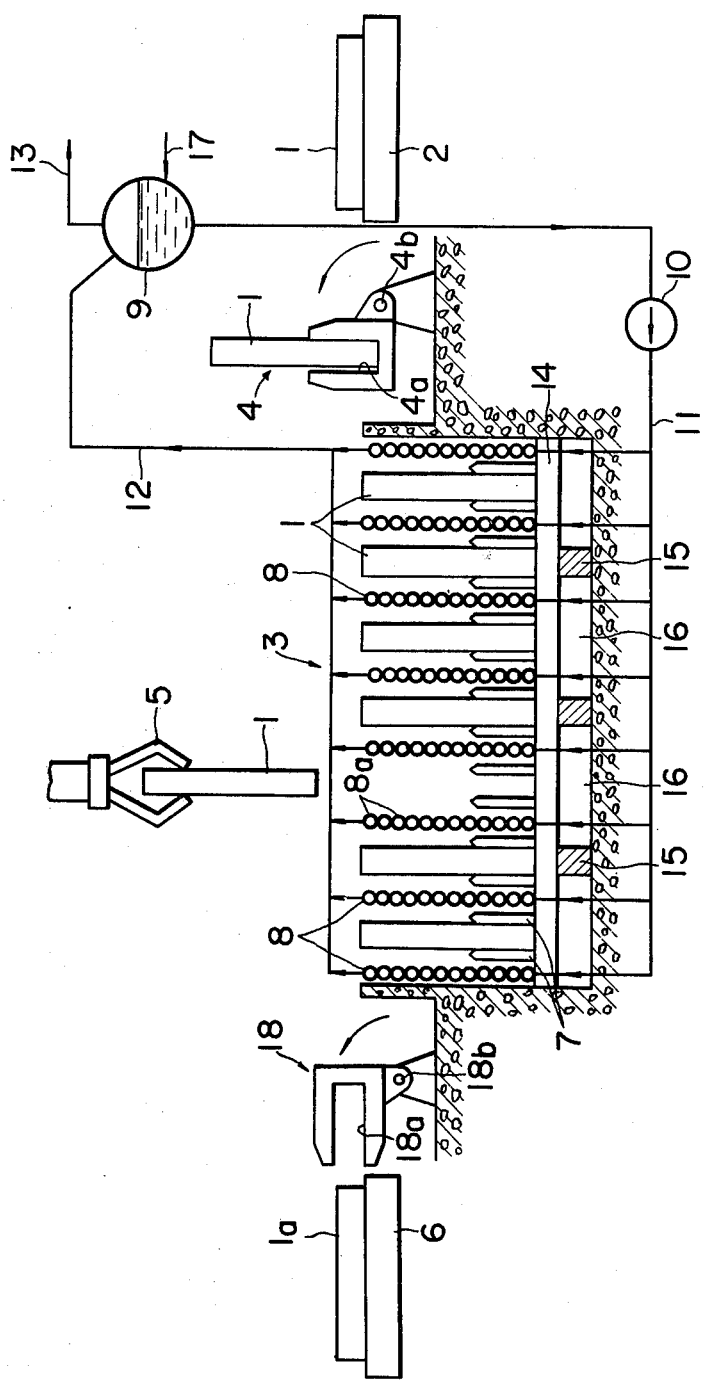
FIG. 2 is a vertical section taken along the plane indicated by line II in FIG. 1 as viewed in the arrow direction and, in addition, shows in schematic form a heat recovery system.

Referring to the drawings, the principal components of the example shown therein of the steel block cooling apparatus according to the invention are a block cooling device 3 installed in a pit, a heat recovery system, and a block handling system. The apparatus of this example is specifically adapted for cooling of slabs 1.

The block (slab) cooling device is advantageously installed in the pit and is supported on joists 14 supported in turn on struts 15 on the bottom of the pit. Cooling walls 8 are disposed in mutually parallel positions with a specific spacing therebetween on the joists 14. Each cooling wall 8 comprises boiler tubes 8a arranged adjacent to each other to form a panel structure, the inlet and outlet ends of each boiler tube being respectively connected to a water circulation piping or down comer 11 and to another water circulation piping or riser 12. The cooling walls 8 have a length in their horizontal direction exceeding the length of the slabs 1, whereby the ends of the cooling walls extend beyond the ends of the slabs 1 in their cooling positions. The heights of the cooling walls 8 are high enough to cover the maximum heights (widths) of the slabs 1 in cooling position. Upright holding posts 7 are fixedly supported on the joists 14 in two parallel rows between each pair of adjacent cooling walls 8 and serve to position and hold each steel slab 1 in upright, edge-on position between the pair of adjacent cooling walls. A space 16 is left between the joists 14 and the bottom of the pit to collect scale falling off the slabs.

The above described cooling walls 8 also constitute, collectively, a component of the aforementioned heat recovery system. The outlets of all cooling walls 8 are connected to the circulation piping or riser 12 conducting therethrough steam and water to a steam drum 9 functioning to separate steam and water and to store boiler water. Boiler water from the bottom of the steam drum 9 is recirculated by a circulation pump 10 through the circulation piping or down comer 11 to the inlets of all cooling walls 8. A main steam pipe 13 is connected to the top of the steam drum 9 to conduct away steam containing recovered heat. A water feed pipe 17 is connected to the steam drum 9 to feed thereinto boiler feed water.

The aforementioned block (slab) handling system has on its "upstream" side a roller conveyer table 2 installed on one side of the slab cooling device 3 with its conveying direction parallel to the cooling walls 8 and serving to convey each steel slab 1 at high temperature from a preceding process to a specific position on the one side of the cooling device 3. A slab uprighting device 4 for receiving in a slot 4a thereof each hot slab 1 from the conveyer table 2 and swinging through substantially 90° of angle about a horizontal axis 4b of rotation to turn the slab from its horizontal position as received into upright, edge-on position is installed between the conveyer table 2 and the cooling device 3. A similar tilting device 18 is provided for receiving in its slot 18a each slab 1a after cooling, in upright position and swinging about an axis 18b through substantially 90° to tilt the cooled slab 1a from its upright position to a substantially horizontal position for transfer to another roller conveyer table 6 on the opposite side of the cooling device 3 or "downstream" side of the slab handling system. In addition, a tong crane 5 is installed to travel over the uprighting device 4, the cooling device 3, and the tilting device 18 and is operated as described hereinafter.

The steel block (slab) cooling apparatus of the above described organization according to this invention operates in the following manner.

Each steel slab 1 at a high temperature from a preceding process machine, such as a slabbing mill, is conveyed by the roller conveyer table 2 to the above mentioned specific position alongside the uprighting device 4. This slab 1 is then pushed into the slot 4a of the uprighting device 4, which is then rotated into the upright position, and the slab 1 is lifted out of the slot 4a by the tong crane 5 and conveyed to and lowered into a vacent cooling position between the two rows of holding posts 7 in the slab cooling device 3. In this cooling position, the slab cools, its heat being transferred principally by radiation to the cooling walls 8 surrounding the slab on two sides thereof.

Each slab 1a thus cooled to a desired temperature is lifted out of the cooling device 3 by the tong crane 5, conveyed to the tilting device 18, tilted to the horizontal position, placed onto the roller conveyer table 6, and conveyed to the succeeding process.

The cooling walls 8 made up of boiler tubes and constituting the heat receiving component of the heat recovery system may be considered to operate as a boiler during the above described operation. The boiler water within these cooling walls 8 is heated by the heat radiation from the hot slabs 1 through the walls of the boiler tubes and becomes a steam and water mixture, which returns through the circulation piping or riser 12 to the steam drum 9, where the mixture is separated into steam and water. The steam thus separated is conveyed through the main steam pipe 13 to be utilized for certain purposes. The water thus separated from the steam is collected in the lower part of the steam drum 9, together with boiler feed water fed through the water feed pipe 17, is recirculated by the circulation pump 10 through the circulation piping or dowm comer 11 to the inlets of the cooling walls 8.

While a heat recovery system in the form of a boiler of forced circulation type has been described above as one example, the construction and tubing of the cooling walls 8 may be of any suitable design provided that they are conductive to efficient recovery of heat and efficient cooling of the steel blocks.

Furthermore, while no examples of practice are illustrated in the drawings, air vent holes can be provided in the surrounding walls or the floor of the scale collecting space 16, so that the steel blocks are cooled additionally by natural convection or forced convection of air in order to increase the rate of cooling of the steel blocks. Conversely, the cooling rate can be decreased by providing a roof to cover the cooling device 3.

As described above with respect to the specific case of cooling of steel slabs, these slabs are cooled while they are held in a vertical edge-on state. For this reason, the slabs are not subject to warping as in conventional cooling facilities, whereby the processing efficiency in the succeeding process steps is greatly improved. By this technique, moreover, not only is a great saving in space effected, but the two faces of each slab are uniformly cooled as the sensible heat of the steel slabs is recovered in a rational and effective manner.

What is claimed is:

1. A steel slab cooling apparatus comprising:
   a base floor structure;
   a plurality of vertical cooling walls erected on said floor structure in mutually parallel and spaced arrangement to form a slab-receiving space between adjacent cooling walls, each of said cooling walls having an inlet and an outlet and including means for passage of cooling water therethrough from said inlet to said outlet;
   upright slab holding posts fixedly mounted on said floor structure in each of said slab receiving spaces, said posts in each slab receiving space being disposed in two parallel rows parallel to said cooling walls to position and hold a steel slab in upright position between the rows;
   first conveying means for conveying hot steel slabs at high temperature to a first position adjacent said cooling walls;
   lifting and carrying means for transferring each of the steel slabs from said first position into a selected one of said slab receiving spaces to place the slab between the respective said two rows of the slab holding posts in the upright position and for transferring each of the slabs after cooling to a second position alongside said cooling walls;
   second conveying means for conveying the slabs away from said second conveying means for conveying the slabs away from said second position;
   means for supplying cooling water to the inlet of each cooling wall;
   means for conducting from the outlet of each cooling wall a mixture of hot water and steam produced in each of said cooling walls by heat absorbed by the cooling water by radiation of heat from the hot steel slabs; and
   a steam drum connected to the conducting means for receiving the mixture of hot water and steam from said conducting means and sending the steam to means for utilizing recovered heat.

2. A steel slab cooling apparatus as claimed in claim 1 in which each of said cooling walls comprises intercommunicating boiler tubes arranged in a row to form a wall structure.

3. A steel slab cooling apparatus as claimed in claim 1 in which a pit is provided containing said floor structure, said floor structure comprising a plurality of joists in mutually spaced arrangement and struts supporting the joists off the floor of the pit to form a space between said joists and the floor of the pit for collecting scale falling off steel slabs.

4. A steel slab cooling apparatus as claimed in claim 1 in which said means for supplying cooling water comprises a circulation pump coupled to said steam drum and a first piping conducting water from the steam drum to the cooling walls, said means for conducting hot water and steam from the outlet of each cooling wall comprising a second piping conducting said mixture of hot water and steam from the cooling walls to the steam drum, the steam drum being provided with a pipe for sending steam to said means for utilizing recovered heat and a pipe for feeding boiler feed water into the steam drum.

5. A steel slab cooling apparatus comprising:

a base floor structure;

a plurality of vertical cooling walls erected on said floor structure in mutually parallel and spaced arrangement to form a slab-receiving space between adjacent cooling walls, each of said cooling walls having an inlet and an outlet and including means for passage of cooling water therethrough from said inlet to said outlet;

upright slab holding means fixedly mounted on said floor structure in each of said slab receiving spaces for positioning and holding a steel slab in upright position;

means for introducing hot slabs between said walls and for removing the slabs after cooling such that each interior wall receives heat from two adjacent slabs on opposite sides thereof by radiant heating;

means for supplying cooling water to the inlet of each cooling wall; and means for conducting from the outlet of each cooling wall a mixture of hot water and steam produced in each of said cooling walls by heat absorbed by the cooling water by radiation of heat from the hot steel slabs.

* * * * *